2 Sheets—Sheet 1.
R. CROCKER & W. H. LYTLE.
Car Brake and Starter.
No. 214,026. Patented April 8, 1879.
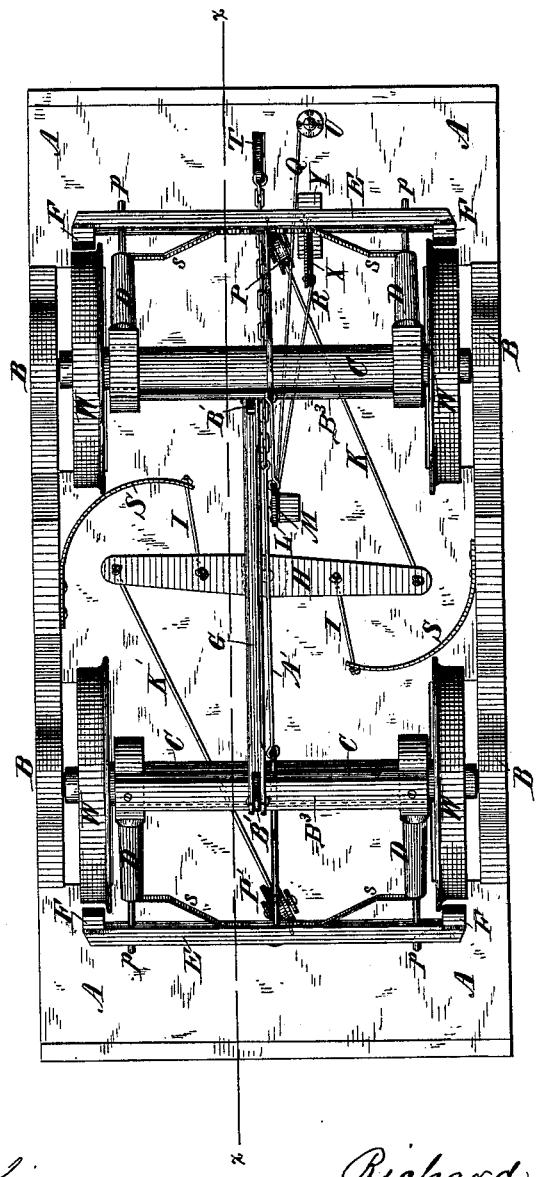

2 Sheets—Sheet 2.
R. CROCKER & W. H. LYTLE.
Car Brake and Starter.
No. 214,026.      Patented April 8, 1879.
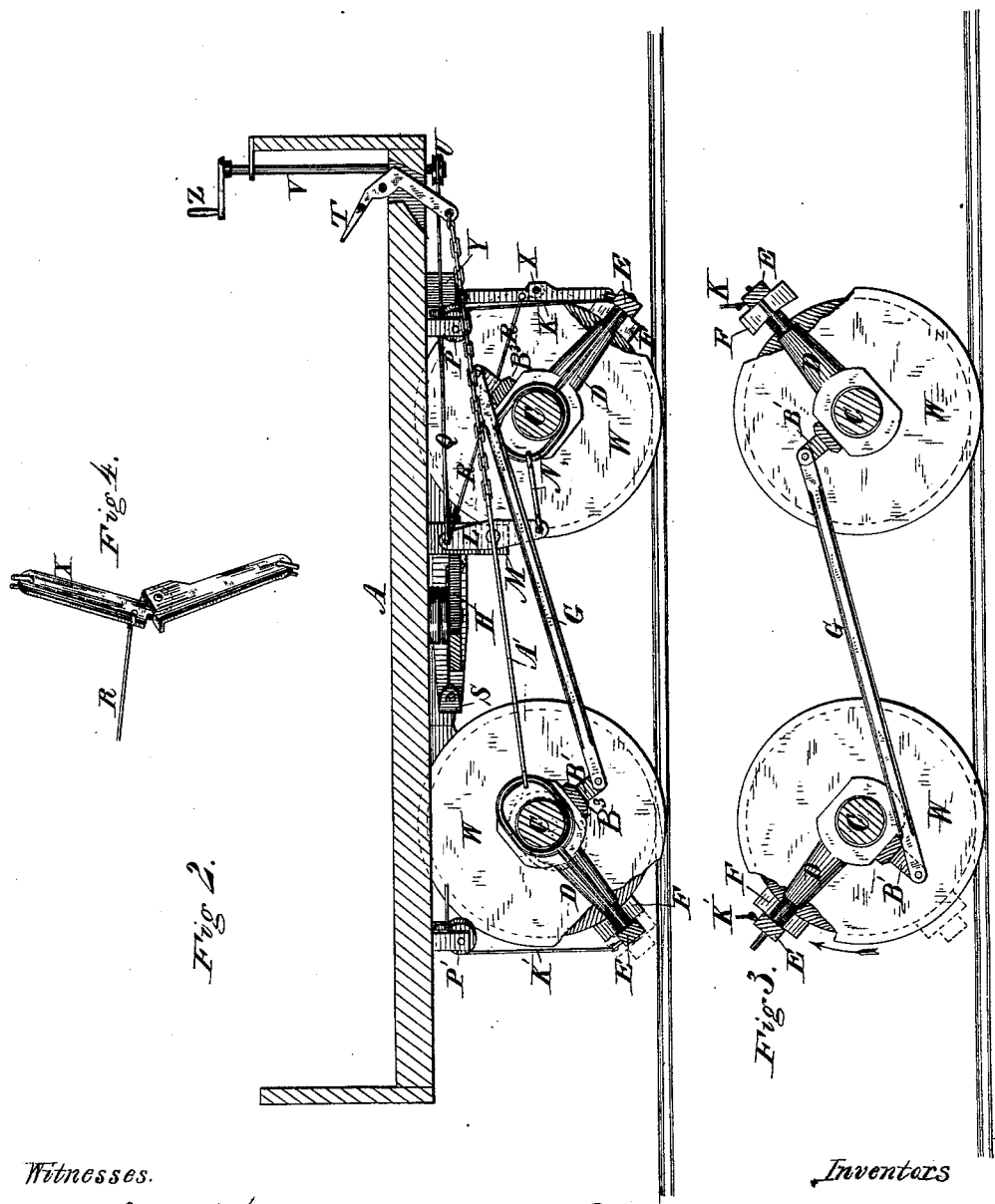
Witnesses.
Harry King
L. Baron
Inventors
Richard Crocker and
Wm. H. Lytle.
By their Attorneys,
Stansbury & Munn

UNITED STATES PATENT OFFICE.

RICHARD CROCKER AND WILLIAM H. LYTLE, OF DES MOINES, IOWA.

IMPROVEMENT IN CAR BRAKE AND STARTER.

Specification forming part of Letters Patent No. 214,026, dated April 8, 1879; application filed September 18, 1878.

*To all whom it may concern:*

Be it known that we, RICHARD CROCKER and WILLIAM H. LYTLE, of Des Moines, in the county of Polk and State of Iowa, have invented certain new and useful Improvements in Car Brakes and Starters; and we do hereby declare that the following is a full, clear, and exact description of the invention, which will enable others skilled in the art to which it appertains to make and use the same, reference being had to the accompanying drawings, and to letters of reference marked thereon, which form a part of this specification.

Figure 1 is a bottom view of a street-car having our improved brake and starter. Fig. 2 is a vertical longitudinal section on line $x\ x$ of Fig. 1, showing the brakes applied. Fig. 3 is a section showing the front brake released and the rear or starting brake applied. Fig. 4 is a detail side view of the trip or toggle on an enlarged scale.

The same part is indicated by the same letter of reference wherever it occurs in the several figures.

The nature of our invention consists in combining in one apparatus, in connection with a street-car, a brake mechanism for stopping the car and mechanism by which a portion of the power expended in stopping the car shall be stored and rendered available for starting the car, the apparatus for both purposes being under control of the driver or conductor from the car-platform, and the whole being applicable at either or both ends of the car, all as hereinafter more specifically set forth.

In the drawings, A marks the floor or bed of the car, to which our combined brake and starter is attached. The wheels W turn on axles C, which are hung in brackets B, attached to the bed A. On the axles C are loosely hung arms D, in the ends of which are pins $p$, on which the brake-bars E are supported and play, being thrown off by the springs $s\ s$, and applied by means hereinafter described. The arms D on each axle are connected by a transverse bar, B³. The bars E are provided with brake blocks or shoes F of the usual form. Each bar B³ has a lever, B¹, upon it, and these are connected by a cross-bar, G, so that both bars B³ shall move together.

Attached by a pivot to the middle of the bottom of the car is the lever H, whose arms are of equal length. This lever is attached by cords I to the springs S S, whose reaction tends to turn the lever in the direction to raise the bars E. The ends of the lever are connected by cords K K', respectively, to the brake-bars E of the forward and rear wheels, the cords passing over the pulleys P P', and being attached to the middle of the brake-bars.

L is a lever, with arms of equal length, pivoted to a stud, M, projecting down from the bed of the car. The lower arm of the lever is connected to the forward brake-bar E by the rod N, provided with a loop to receive the axle. The upper arm of lever L is connected with the brake-wheel U by a cord, Q, and with toggle X by cord R.

The toggle X is shown in its straight position in Fig. 2, and in its bent position in the separate view in Fig. 4. Its upper end is attached to the block Y, and its lower end to the brake-bar E, as shown in Fig. 2. The toggle-arms are straightened out by the downward movement of the brake-bar E, and, when in line, hold the brake down till they are tripped or bent by the traction of the cord R, attached to lever L.

V is the shaft, and Z the winch or crank, of the brake-wheel U, around which the cord Q is wound by turning the winch to apply the forward brake.

T is a bent foot-lever or treadle, pivoted as shown in Fig. 2, and located near shaft V of the brake-pulley or wheel U, so as to be readily operated by the foot of the driver of the car. A chain or rod connects the lower end of this bent lever to the rear brake-bar E, so that by bearing with the foot on the treadle T the rear brakes are applied.

When the brakes are applied by the direct action of the winch or treadle, the tension of the springs $s\ s$ is developed by their compression, and when either the winch or treadle is released the reaction of the springs throws the brake-bars off and trips the toggle. When the rear brakes are applied to the hind wheels by the treadle, the rise of the rear brake-bar carries the rear wheels round in the direction to start the car. Thus the compression of the springs S S preserves a portion of the force employed to stop the car by the application of the forward brakes, and renders it available at the moment when those brakes are released to turn the hind wheels and start the car.

The operation more in detail is as follows: When it is desired to stop the car the winch Z is turned, and the cord Q is wound around wheel U. This draws forward the upper arm of lever L, draws back the forward brake-bar E, applies the brake-shoes F to the fore wheels, and straightens out the arms of the toggle X, so as to keep the brake applied. The springs S S are by the same action compressed.

When it is desired to start the car the front brake is kept down, while the foot is applied to treadle T, which applies the rear brakes. The winch Z is now released and the springs S S draw up the front brake-bar. At the same time those springs raise the rear brake-bar, while the brake-shoes are still kept applied to the hind wheels by the action of treadle T, thus imparting revolution to those wheels in the direction to start the car. The treadle is then released from pressure, the rear brakes are thrown off by springs $s\ s$, and the car is free to move in obedience to the impulse received.

Having thus fully described our invention, what we claim is—

1. In combination with the brake-wheel U and mechanism for operating the same, the cord Q, lever L, looped rod N, arm D, brake-rod E, and shoes F, all constructed, arranged, and operating substantially as specified.

2. In combination with the toggle X, arranged as described, the cord R and lever L, in operative connection with the springs $s$ to trip the toggle, all as specified.

3. The combination of the bars $B^3$, levers B $B^1$, connecting-rod G, and mechanism for operating the same to produce concurrent movement of the bars $B^3$, as and for the purpose set forth.

4. The combination of the lever H, cords I, springs S S, cords K K', pulleys P P', and brake-bars E E, all constructed and arranged substantially as and for the purpose stated.

5. The combination of the treadle-lever T, chain or rod A', rear brake-bar E, and springs $s\ s$, all arranged and operating as specified.

6. The combination of the brake-shoes attached to the rear brake-bar and mechanism, substantially as described, for applying those shoes to the rear wheels, with the mechanism described for raising said brake-bar, whereby the wheels are turned to start the car.

In testimony that we claim the foregoing as our own invention we affix hereto our signatures in presence of two witnesses.

RICHARD CROCKER.
WILLIAM H. LYTLE.

Witnesses:
THOS. CAVANAGH,
F. P. MOHLER.